May 20, 1952  B. ROZETT  2,597,188
LOW-VOLTAGE CIRCUIT TESTER
Filed Aug. 18, 1948  2 SHEETS—SHEET 1

Inventor:
Benjamin Rozett,
By Chritton, Schroeder,
Merriam & Hofgren, Attys.

May 20, 1952 B. ROZETT 2,597,188
LOW-VOLTAGE CIRCUIT TESTER
Filed Aug. 18, 1948 2 SHEETS—SHEET 2
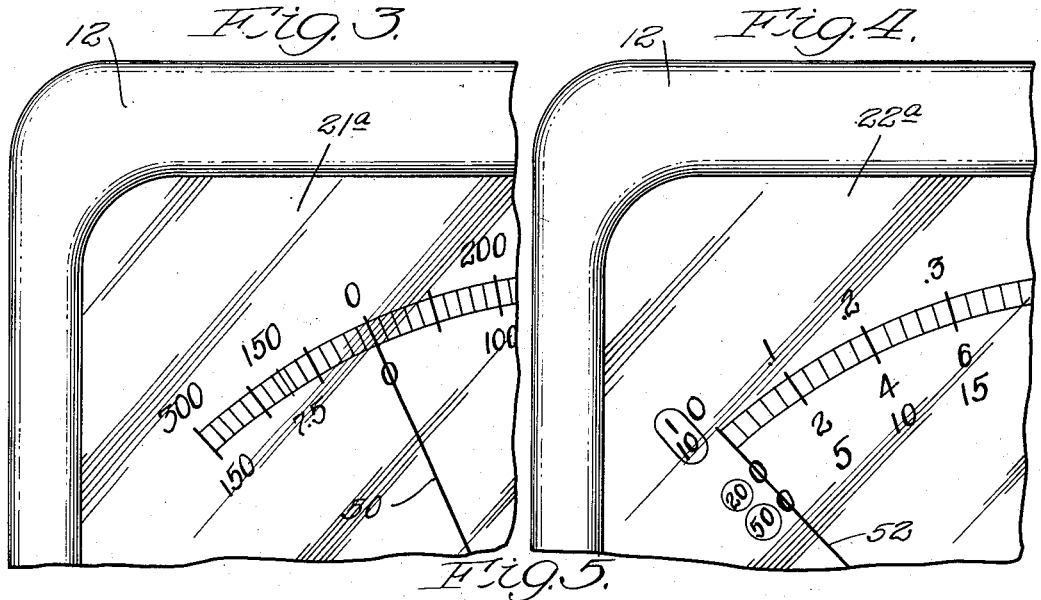
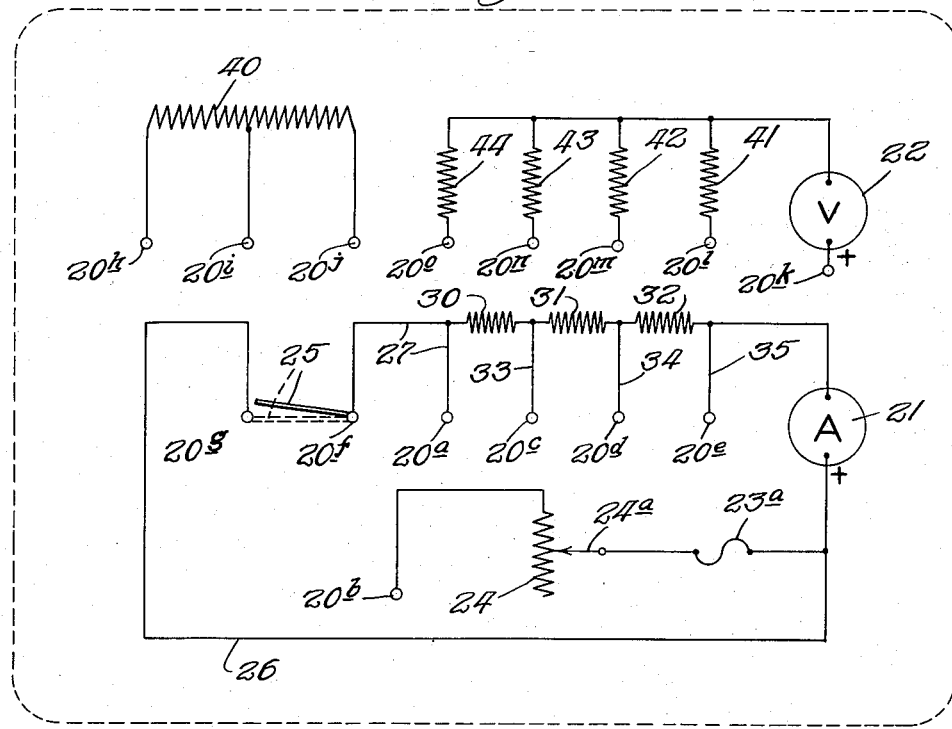
Inventor:
Benjamin Rozett,
By Britton, Schroeder,
Merriam & Hofgren, Attys.

Patented May 20, 1952

2,597,188

UNITED STATES PATENT OFFICE 2,597,188

LOW-VOLTAGE CIRCUIT TESTER

Benjamin Rozett, Chicago, Ill., assignor to Joseph Weidenhoff, Incorporated, a corporation of Illinois Application August 18, 1948, Serial No. 44,906

1 Claim. (Cl. 171—95)

This invention relates to circuit testing apparatus, and more particularly to apparatus for making low voltage circuit tests.

One feature of this invention is that it provides circuit testing apparatus whereby all necessary low voltage circuit tests may be performed on a vehicle, as for example a tank, by a unitary portable device; another feature of this invention is that it provides a circuit testing apparatus comprising an ammeter having a plurality of ranges, and including a selectively operable variable resistance for performing certain tests, a voltmeter having a plurality of ranges, and apparatus for testing a battery or generator and all other devices included in the primary circuit under load or otherwise; a further feature of this invention is that the circuit including the above mentioned varable resistance is fused for rendering the resistance circuit in operable on the higher undesired meter ranges; still another feature of this invention is that while a plurality of meter ranges are provided, each range is connectable by means of a different terminal, thereby eliminating all switches with their attendant disadvantages; yet a further feature of this invention is that the above mentioned terminals project from the face of the apparatus a substantial distance and are arranged on said face in a manner to support said face above a surface to protect the meters in the event the device is knocked over; an additional feature of the invention is that it provides an ammeter having a plurality of required shunts in series with the common terminal and one side of meter together with a plurality of other terminals for providing the various ammeter ranges, certain of said other terminals being connected to said meter through only a portion of said shunts and one of said other terminals being connected directly to said meter so that one or more of the shunts may be in circuit in parallel with the meter while one or more of the other shunts may at the same time be in series with the meter, providing a plurality of ammeter ranges without switching between shunts; still a further feature of the invention is that it provides a pair of terminals connected by an openable shorting bar, said terminals being adapted to provide connections for an external shunt in which event the internal shunts mentioned above are no longer used as such in parallel with the meter, but are all connected in series therewith; and still an additional feature of the invention is that it provides a meter having a plurality of ranges and a scale comprising a combination of different indicia to provide indications over a plurality of ranges.

Other features and advantages of the invention will be apparent from the following specification and from the drawings in which:

Fig. 3 is an enlarged fragmentary view of part of the indicating portion of one of the meters;

Fig. 4 is an enlarged fragmentary view of part of the indicating portion of another meter; and Fig. 5 is a schematic diagram of the circuit of the apparatus.

In making low voltage tests of the electrical systems of vehicles, as for example the electrical system of a tank or administrative vehicle, it is necessary to make current or amperage tests, and voltage tests over a plurality of ranges. In the past no single unitary portable testing device has been devised for making all of the necessary tests, and most of the devices which have been used in performing the tests, in addition to being incapable of performing all the required tests, have had disadvantages in that they were easily broken, generally included switching arrangements between the ranges and included numerous different scales to cover the various meter ranges. Where the apparatus is subjected to extreme climatic conditions, as for example the hot, humid climate found in Africa or in the Pacific islands, the switch contacts in such meters often develop high resistance and quickly destroy the accuracy of the meters.

I have devised and am herewith disclosing and claiming improved circuit testing apparatus particularly designed to perform all the low voltage tests which may be required in a vehicle, as for example in a tank or administrative vehicle. My apparatus comprises a compact unitary portable structure which is protected from damage in the event it is inadvertently knocked over, which eliminates the switching arrangements formerly found, and which is very readily used by a relatively unskilled operator and which includes a novel scale arrangement providing readily readable indications over a plurality of meter ranges with a minimum of scales. The apparatus illustrated is adapted to perform the following tests in the low voltage circuits of a tank or other vehicle: tests for voltage drops over all or any of the various portions of the low voltage circuit; tests of the battery and the individual cell voltages, both with and without load; tests of the starting motor, as for example the current draw under normal conditions and under lock torque where the tank is in gear and brakes are locked; tests of the generator output at various speeds and the gross input and net input to the battery with any or all of the various tank accessories drawing current; the electrical demands of the gun turrets and firing control equipment; tests of the voltage regulator; and all other electrical functions of the low voltage circuits.

Figure 2:
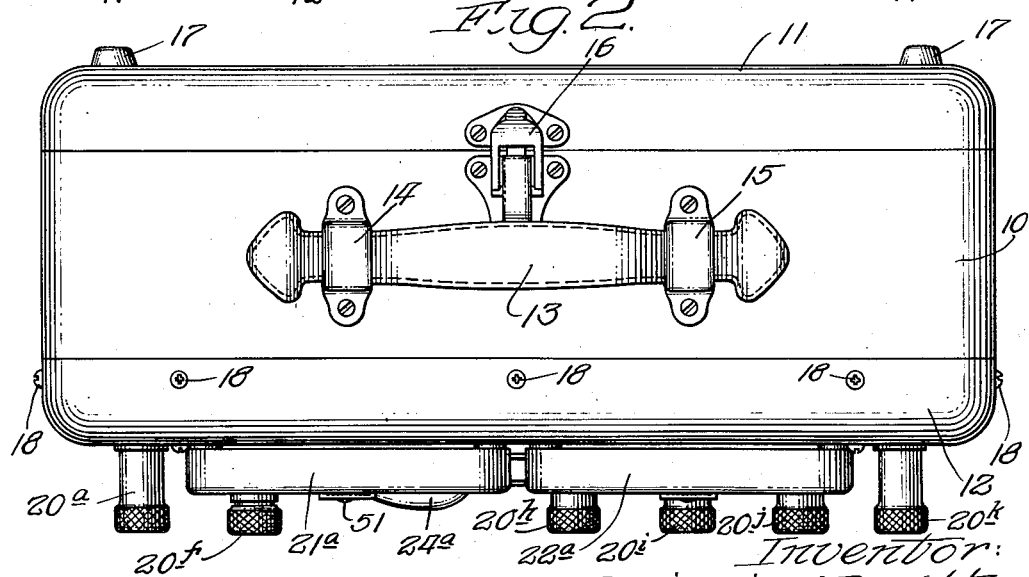
Fig. 2 is a top plan view thereof.

Referring now more particularly to the drawings the apparatus comprises a casing having a main body portion 10, a back 11 and a front or face portion 12. The portion 10 has a handle for carrying purposes, this handle comprising a leather strap 13 secured by keepers 14 and 15 which are screwed to the top of the body portion 10. The back 11 is secured to the body 10 by means of a lock device 16, and the interior of the back portion is utilized to carry testing accessories, as for example leads, shunts, etc. Preferably rubber grommets 17 are provided on the back and bottom of the device to prevent the device from marring the surface on which it rests and to prevent the device from itself being marred by said surface. The front portion 12 is secured to the body portion 10 by means of screws 18, and the portion 12 carries a plurality of terminals 20a–20o which project from the face of the casing a substantial distance as shown in Fig. 2 for a purpose to be hereinafter described. The casing houses an ammeter 21 which has an indicating portion 21a in the face 12 of the casing, and a voltmeter 22 which also has an indicating portion 22a in the face of the casing. A fuse housing 23 is provided, and a rotatable knob 24a is provided to control a variable resistance 24 (see Fig. 5) which is within the casing. An openable shorting bar 25 connects the terminals 20f and 20g, this bar being pivotally mounted on the terminal 20f and having a slot 25a for removable engagement with the terminal 20g.

One side of the ammeter (the positive side as illustrated) is connected to the common terminal 20a through a circuit of negligible resistance, this circuit including a lead 26 connected between the positive side of the meter and the terminal 20g, the openable shorting bar 25, and a lead 27 connected to the common terminal 20a. This common terminal is connected to the other or negative side of the ammeter through a plurality of required shunts (resistors) 30, 31 and 32 which are connected in series between said terminals and said side of the ammeter. The terminal 20c, which in the apparatus illustrated may be connected to provide a 100 ampere range on the meter, is connected to the negative side of the meter through only a portion of the shunts, this terminal being connected by a lead 33 to the midpoint between the shunts 30 and 31. Obviously if it is desired to use the meter on a 100 ampere scale the terminals 20a and 20c are connected in series in the circuit to be measured (the shorting bar 25 being closed as shown in broken lines) and with this arrangement the shunts 31 and 32 will be in series with the meter while the shunt 30 will be shunted thereacross. Another terminal 20d is connected by means of a lead 34 to the midpoint between the shunt 31 and 32. This terminal is designed to provide a 50 ampere range on the meter, and with the terminals 20a and 30d connected in the circuit the shunt 32 will be in series with the meter while the shunts 30 and 31 will provide required shunt therewith. Another terminal 20e is connected directly to the negative side of the meter by means of a lead 35. This terminal is designed to provide a 10 ampere scale, and with the common terminal 20a and the terminal 20e connected in the circuit to be measured the shunts 30, 31 and 32 will all be in shunt with the meter, this arrangement providing a plurality of ammeter ranges without switching between shunts.

Obviously, as many ranges as desired may be provided without switching, the construction being such that the various ranges are made by using all or certain portions as desired of the shunts across the meter and using the balance of the shunts as a connector in series with the meter. In addition, the provision of the openable shorting bar 25 provides means for connecting additional shunt resistances, and if desired such shunts may be provided and may be carried in the back 11 of the casing to provide other ranges, as for example ranges of 500 and 1000 amperes.

The terminal 20b is connected to one end of the variable resistor 24, which may have a maximum value of 125 ohms, and the movable tap of the resistor is operated by the knob 24a as earlier stated. This movable tap is connected to the positive side of the meter through a fuse 23a which may be carried in the fuse housing 23. Preferably the fuse is of relatively low amperage (as for example 10 amperes), and in any event is of an amperage lower than at least the highest of the meter ranges so that, while this circuit, including the resistance 24 may be used on the lower ranges of the meter, the circuit will be rendered inoperable should it be attempted to use the circuit on the higher ranges as 50 or 100 amperes.

The variable resistance 24 is used to provide a resistance in series with the insulated side of the charging circuit to test some generators, and this test is always made when the generator is putting out less than 10 amperes, the variable resistance providing a variable load to vary the voltage for testing. If the operator should inadvertently attempt to use this circuit when the generator was putting out heavy current, as for example 40 or 50 amperes, the fuse will blow, thus protecting the meter and the resistance 24 from the heavy flow of current.

The provision of an ammeter having a plurality of ranges together with the combination of a selectively operable variable resistance for performing certain tests is novel and results in a device of far greater utility than has heretofore been found in the art since all of the necessary current tests may be performed by a single device. The further provision of a separate terminal for each range simplifies the use of the apparatus and aids in preventing the apparatus from being used on the wrong range since it is necessary for the operator consciously to connect the apparatus to the circuit he desires to test, and consequently it is highly unlikely that the 10 ampere terminal 20e would be connected by the operator into a high current circuit. Furthermore, the provision of the series-connected shunts entirely eliminates the necessity of switching between shunts, and if the apparatus is utilized in a damp or humid climate there are no concealed switches to corrode, become covered with fungus, or otherwise deteriorate, and there is no possibility that a high resistance will develop across the meter, thus destroying its utility as an ammeter. The necessity of connecting an external shunt for excessive high amperage ranges will act as a warning to the operator and remind him that high currents are present, and again it is not necessary to switch between shunts since the three series-connected shunts 30, 31 and 32 merely become connectors in series with the meters when a high range external shunt is connected across the terminals 20f and 20g.

Another resistor 40 which may have a value of 1.5 ohms is mounted in the casing, the opposite ends of this resistor being connected to the terminals 20h and 20j while the center tap of the resistor is connected to the terminal 20i. These terminals may be used in making certain tests upon the voltage regulator, the terminals 20a and 20i being connected in the circuit for 6 volt tests and the terminals 20h and 20j being connected in the circuit for 12 volt tests.

The voltmeter 22 is also connected to provide a plurality of ranges. The common (here shown as the positive) side of the meter is connected to the terminal 20k, and the negative side of the meter is connected to the terminals 20l–20o in parallel. As illustrated a resistor 41, which may have a value of 50,000 ohms, is connected in series between the terminal 20l and the negative side of the meter to provide a 50 volt range; a resistor 42, which may have a value of 20,000 ohms, is connected in series between the terminal 20m and the negative side of the meter to provide a range of 20 volts; a resistor 43, which may have a value of 10,000 ohms, is connected between the terminal 20n and the negative side of the meter to provide a 10 volt range; and a resistor 44, which may have a value of 1,000 ohms, is connected between the terminal 20o and negative side of the meter to provide a one volt range.

Again as in the case of the ammeter there are no switches to be operated in the volt meter circuits and there can be no abnormal high resistance connections which develop because of climatic or other conditions in use, and as the case in the ammeter circuits it is necessary for the operator consciously to connect a lead to one of the terminals in order to operate the meter, thereby minimizing the possibility that the operator will attempt to use the meter across a high voltage circuit when it is arranged to operate on one of its lower ranges.

Figure 1:
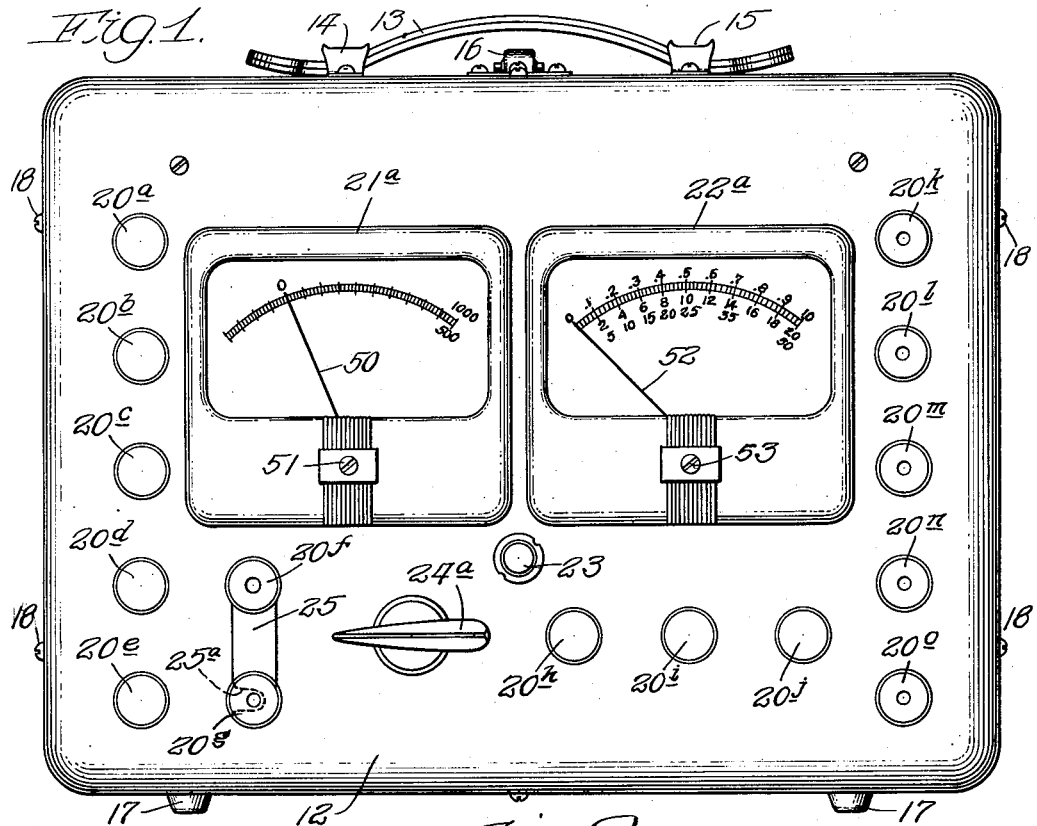
Fig. 1 is a front elevational view of my improved circuit testing apparatus.

In addition to the electrical advantages found in my circuit testing apparatus, there are certain mechanical advantages provided. Referring particularly to Figs. 1 and 2 it will be seen that the terminals 20 project a substantial distance from the face of the casing and the arrangement of the terminals on the face is such that the terminals will support the casing in the event the device is knocked over on its face and the indicating portions of the meters (which normally are glass enclosed) will be protected against damage. By this arrangement the same terminals which provide an electrical function are arranged to provide a mechanical advantage not found in other devices.

In addition I have provided an arrangement wherein, despite the large number of meter ranges, a minimum of scales are utilized and each scale comprises a combination of different indicia to provide readily readable indications over a plurality of ranges. Referring first to the indicating portion 21a of the ammeter 21, the meter pointer or needle 50 may be adjusted by means of an adjusting screw 51 to give a zero reading when the meter is disconnected as shown. Preferably the zero point on the ammeter scale is not at the extreme left of the scale since certain types of apparatus to be tested, as for example reverse current relays, utilize a negative polarity current. Despite the fact that the ammeter illustrated has 5 ranges of maximum deflection, as 10, 50, 100, 500 and 1,000 amperes, there are only two scales and each scale provides indications over a plurality of ranges. The top scale may be utilized to read the current for the ranges of 10, 100 and 1,000 amperes and the bottom scale may be utilized for the ranges of 50 and 500 amperes. I achieve this desirable result by forming the numbers of each scale of a combination of different colors. For example, the second number of each scale marking in the top scale may be formed of a different color than are the first and third numbers, the farthest number to the left in Fig. 3 (the number 300) appearing as a black three, a red zero, and a black zero. Thus when utilizing the 10 ampere range only the first number is used and if the pointer 50 swings to this far left position the operator will know that a current of 3 amperes is flowing in the circuit. If the range is 100 amperes the black three and red zero will be utilized and the operator will know that 30 amperes are flowing in the circuit while if the thousand ampere range is utilized the operator reads all three numbers and it will be apparent that 300 amperes are flowing in the circuit. Similarly, on the bottom scale the different colored indicia provide a ready differentiation between the 50 ampere range and 500 ampere range. For example, referring to Fig. 1, the highest number (500) on this scale comprises a black five, a black zero, and a red zero. For the 50 ampere range only the black numbers are used and for the 500 ampere range all the numbers are used. In both the upper and lower scales the reference number at the right end or high end of the scale will show the operator the maximum deflection of the range he is working on, thereby minimizing any chance for error.

Similarly, in the voltmeter 22 only three scales are necessary despite the fact that the meter covers four ranges. In this meter, as shown in Fig. 1, a pointer 52 normally zeros at the left end of the scale, an adjusting screw 53 being provided to set the zero point. As shown in Fig. 4 the scale at the top is used for maximum deflection ranges of one volt and 10 volts despite the fact that there is only one set of numbers on this scale. I prefer that the numbers be black and that at each unit mark there is a decimal point of a different color, as for example red. Thus when using the one volt scale the operator will read the numbers including the decimal point as indicated by the highest number on the scale, and when using the 10 volt scale the operator will read the black numbers while ignoring the red decimal points, the different colors serving to facilitate the reading of the scale. There are two lower sets of numbers in vertical alignment to provide maximum deflection ranges of 20 volts and 50 volts. I prefer that these sets of numbers be of different colors, as for example the 20 volt scale utilizing black numbers and the 50 volt scale utilizing red numbers.

While I have shown and described certain embodiments of my invention, it is to be understood that it is capable of many modifications. Changes, therefore, in the construction and arrangement may be made without departing from the spirit and scope of the invention as disclosed in the appended claim.

I claim:

Circuit testing apparatus of the character described, comprising: a casing having a plurality of terminals projecting from one face thereof; an ammeter in the casing, said meter having an indicating portion visible externally of said face; a circuit of negligible resistance connecting one of said terminals to one side of said meter; a circuit including a variable resistance and a fuse connected in series between another of said terminals and said side of said meter; and circuit components in said casing connecting other of said terminals to the other side of said meter for providing a plurality of meter ranges, said fuse being of lower amperage than at least the highest of said meter ranges for rendering said resistance circuit inoperable on at least said highest range.

BENJAMIN ROZETT.

REFERENCES CITED

The following references are of record in the file of this patent:

UNITED STATES PATENTS

| Number | Name | Date |
| --- | --- | --- |
| 1,705,301 | Miller | Mar. 12, 1929 |
| 1,901,343 | Eastham | Mar. 14, 1933 |
| 2,183,617 | Kurz | Dec. 19, 1939 |
| 2,384,350 | Skulley | Sept. 4, 1945 |
| 2,507,803 | Miller | May 16, 1950 |

FOREIGN PATENTS

| Number | Country | Date |
| --- | --- | --- |
| 367,085 | Great Britain | Feb. 18, 1932 |
| 319,756 | Italy | July 19, 1934 |
| 641,381 | Germany | Jan. 29, 1937 |
| 490,635 | Great Britain | Aug. 18, 1938 |

OTHER REFERENCES

Publication I, "Radio's Master," published by United Catalog Publishers, Inc., New York city 13, N. Y., copyright 1944, page F-27. (Copy in Division 69.)

Publication II, "General Electric Review," published by General Electric Co., June 1946, page 58. (Copy in Division 69.)